United States Patent
Basso et al.

(10) Patent No.: US 9,531,847 B2
(45) Date of Patent: Dec. 27, 2016

(54) SKIPPING AND PARSING INTERNET PROTOCOL VERSION 6 (IPV6) EXTENSION HEADERS TO REACH UPPER LAYER HEADERS

(71) Applicant: International Business Machines Corporation, Armonk, NY (US)

(72) Inventors: Claude Basso, Nice (FR); Todd A. Greenfield, Rochester, MN (US); Michel Poret, Valbonne (FR); Natarajan Vaidhyanathan, Carrboro, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 14/284,927

(22) Filed: May 22, 2014

(65) Prior Publication Data
US 2015/0341261 A1 Nov. 26, 2015

(51) Int. Cl.
| | | |
|---|---|---|
| H04L 29/06 | (2006.01) | |
| H04L 29/12 | (2006.01) | |
| H04L 12/741 | (2013.01) | |
| H04L 12/56 | (2006.01) | |
| H04L 12/64 | (2006.01) | |
| H04L 12/24 | (2006.01) | |

(52) U.S. Cl.
CPC ........... *H04L 69/22* (2013.01); *H04L 12/6418* (2013.01); *H04L 29/0653* (2013.01); *H04L 29/12* (2013.01); *H04L 45/74* (2013.01); *H04L 45/741* (2013.01); *H04L 61/6059* (2013.01)

(58) Field of Classification Search
CPC .. H04L 29/0653; H04L 69/22; H04L 12/6418; H04L 45/741; H04L 61/6059
See application file for complete search history.

(56) References Cited

U.S. PATENT DOCUMENTS

| | | | |
|---|---|---|---|
| 7,367,052 B1 * | 4/2008 | Desanti | H04L 63/06 709/229 |
| 8,572,054 B2 * | 10/2013 | Oh | H03M 7/30 341/50 |
| 2005/0089030 A1 * | 4/2005 | Wilson | H04L 29/06 370/389 |
| 2006/0262788 A1 * | 11/2006 | Johnson | H04L 69/04 370/389 |

(Continued)

OTHER PUBLICATIONS

List of IBM Patents or Patent Applications Treated As Related.
(Continued)

*Primary Examiner* — Omer S Mian
(74) *Attorney, Agent, or Firm* — Patterson + Sheridan, LLP

(57) ABSTRACT

Embodiments presented herein describe techniques for parsing an Internet Protocol version 6 frame and skipping extension headers of the frame. A configurable skip list is provided that specifies extension headers for a networking device to skip when parsing the frame. The networking device examines "next header" fields of each extension header to determine a next extension header in the chain. If the next extension header matches an extension header in the skip list, the networking device iterates to the next header in the chain until the end of the chain (or an extension header that does not contain a match in the list) is reached.

8 Claims, 7 Drawing Sheets

(56) References Cited

U.S. PATENT DOCUMENTS

2010/0316052 A1* 12/2010 Petersen ............... H04L 45/00
 370/392
2015/0188885 A1* 7/2015 Jager ................. H04L 63/0236
 726/13

OTHER PUBLICATIONS

Basso et al., "Skipping and Parsing Internet Protocol Version 6 Extension Headers to Reach Upper Layer Headers", U.S. Appl. No. 14/521,142, filed Oct. 22, 2014.
U.S. Appl. No. 14/284,859, entitled "Access Control List-Based Port Mirroring Techniques", filed May 22, 2014.
U.S. Appl. No. 14/284,788, entitled "Atomically Updating Ternary Content Addressable Memory-Baed Access Control Lists", filed May 22, 2014.
U.S. Appl. No. 14/284,811, entitled "Supporting Access Control List Rules That Apply to TCP Segments Belonging to 'Established' Connection", filed May 22, 2014.
U.S. Appl. No. 14/296,574, entitled "Unified Framework for Isolating Multicast and Broadcast Frames to a Traffic Class Separate From a Traffic Class Used for Unicast Frames ", filed Jun. 5, 2014.

* cited by examiner

```
Input: Well-formed IPv6 frame

V6PARSE_LIMIT = 168;        // 128B of Extension Hdr, 40B of Fixed Hdr pPtr = 0;                   // Start of Fixed Hdr
NH = *(pPtr + 6);           // Next Hdr -- from Fixed Hdr to start
JL = 40;                    // Jump Length - length of Fixed Hdr to start FO = 0, Res = 0, MF = 0     // Fragmentation Info While ( (NH in Skip_List) && (pPtr + JL < v6PARSE_LIMIT) ) {
    pPtr += JL;
    if     NH == FRAG_EH
           // No Length field in Fragment EH
           JL = 8;
           Extract FO, RES, MF;  // Fragmentation Info
    else if NH == AUTH_EH
           // Length field has different 4B-based encoding
           JL = (((uint 16)*(pPtr+1)) + 2) *4;
    else
           // Common case
           JL = (((uint 16)*(pPtr+1)) + 1) *8
    endif;
    NH = *pPtr;
}
// Extensions have been skipped as much as possible
If NH == 6
    // pPtr points to TCP header
    Return SP/DP and TCP flags, Fragmentation Info
else
    Return first 5 bytes pointed by pPtr, Fragmentation info
endif
```

Step 615 → (pPtr, NH, JL initialization)

Steps 620, 625 → (While loop)

Step 635 → (If NH == 6 block)

FIGURE 7 ial illustrates a system architecture that includes a
SKIPPING AND PARSING INTERNET PROTOCOL VERSION 6 (IPV6) EXTENSION HEADERS TO REACH UPPER LAYER HEADERS

BACKGROUND

Internet Protocol (IP) is a communications protocol that provides an identification and location system for computers and networks and routes traffic across the Internet. Internet Protocol version 6 (IPv6) is a successor protocol over that implements several updates over Internet Protocol version 4 (IPv4).

IPv6 frames include control information (for addressing and routing) and a data payload. Further, the control information includes two distinct types of headers: a mandatory fixed length header and optional extension headers. Extension headers, introduced in IPv6, carry optional Internet Layer information and are placed between the fixed header and the upper-layer protocol header of an IPv6 frame. Each header forms a chain using "next header" fields. A "next header" field in the fixed header indicates the type of the first extension header (if any). The "next header" field of the last extension header indicates the type of the upper-layer protocol header in the payload of the frame.

SUMMARY

Embodiments presented herein provide a method for parsing a network frame received by a networking device. The method may generally include evaluating a fixed header of the network frame to determine a next header of a chain of extension headers. Each header in the network frame includes a field describing the next header in the chain. Upon determining that the next header matches a first corresponding extension header specified in a skip list, the chain of extension headers is iterated through until (i) a second extension header is reached, wherein the second extension header does not correspond to an extension header in the skip list, or (ii) an upper-layer header of the network frame is reached.

Another embodiment includes a computer program product, itself comprising a computer-readable storage medium having computer-readable program code embodied therewith, the computer-readable program code configured to perform an operation for parsing a network frame received by a networking device. The operation may generally include evaluating a fixed header of the network frame to determine a next header of a chain of extension headers. Each header in the network frame includes a field describing the next header in the chain. Upon determining that the next header matches a first corresponding extension header specified in a skip list, the chain of extension headers is iterated through until (i) a second extension header is reached, wherein the second extension header does not correspond to an extension header in the skip list, or (ii) an upper-layer header of the network frame is reached.

Still another embodiment includes a processor and a memory storing a program, which, when executed on the processor, performs an operation for parsing a network frame received by a networking device. The operation may generally include evaluating a fixed header of the network frame to determine a next header of a chain of extension headers. Each header in the network frame includes a field describing the next header in the chain. Upon determining that the next header matches a first corresponding extension header specified in a skip list, the chain of extension headers is iterated through until (i) a second extension header is reached, wherein the second extension header does not correspond to an extension header in the skip list, or (ii) an upper-layer header of the network frame is reached.

BRIEF DESCRIPTION OF THE SEVERAL VIEWS OF THE DRAWINGS

FIG. 7 illustrates sample code for carrying out the method of FIG. 6, according to one embodiment.

DETAILED DESCRIPTION

Embodiments presented herein describe techniques for skipping extension headers in an Internet Protocol version 6 (IPv6) frame. In one embodiment, a Layer 2 network switch (or other networking device) includes a skip list. The skip list is a configurable listing of extension headers for the networking device to skip when parsing information from an incoming IPv6 frame. Headers in an IPv6 frame form a chain using "next header" fields. The network switch parses a fixed header of a given frame and traverses the chain of "next header" fields to skip extension headers specified in the skip list. More specifically, if an identified extension header corresponds to an extension header specified in the skip list, the network switch automatically traverses to a next header in the frame, without analyzing the extension header. The network switch continues to do so until reaching the upper layer protocol header (or if the switch reaches an extension header not specified in the skip list). Doing so allows the network switch to identify the frame type, which further allows the network switch to make forwarding decisions for the frame more quickly than if the network switch had analyzed each extension header.

Generally, Layer 2 networking devices are not required to process IPv6 extension headers when forwarding traffic. Therefore, a network switch may identify an IPv6 frame (e.g., whether the frame is TCP or UDP) more quickly by skipping analysis of extension headers. Advantageously, the skip list described herein allows the network switch to access Upper Layer header information and route traffic more efficiently across a network.

Note, the following description relies on a distributed network switch as a reference example of a networking device that skips specified extension headers when parsing an IPv6 frame. However, one of skill in the art will recognize that techniques are applicable in other contexts related to parsing IPv6 headers. For example, the techniques may also generally be adapted to other networking devices that receive IPv6 frames or packets and make routing decisions based on the frames and packets.

Figure 1:
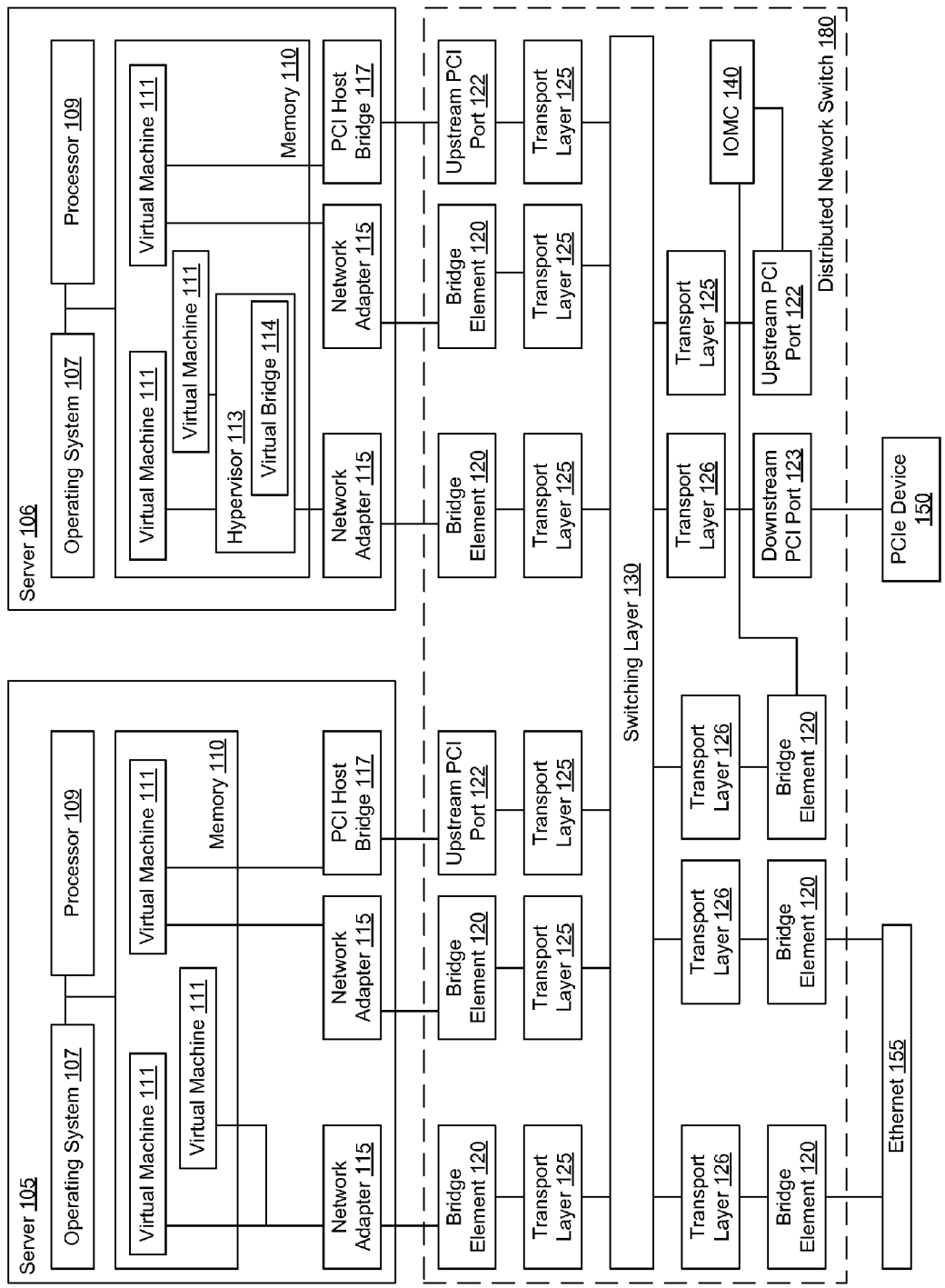
FIG. 1 illustrates a system architecture that includes a distributed network switch, according to one embodiment.

FIG. 1 illustrates a system architecture 100 that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
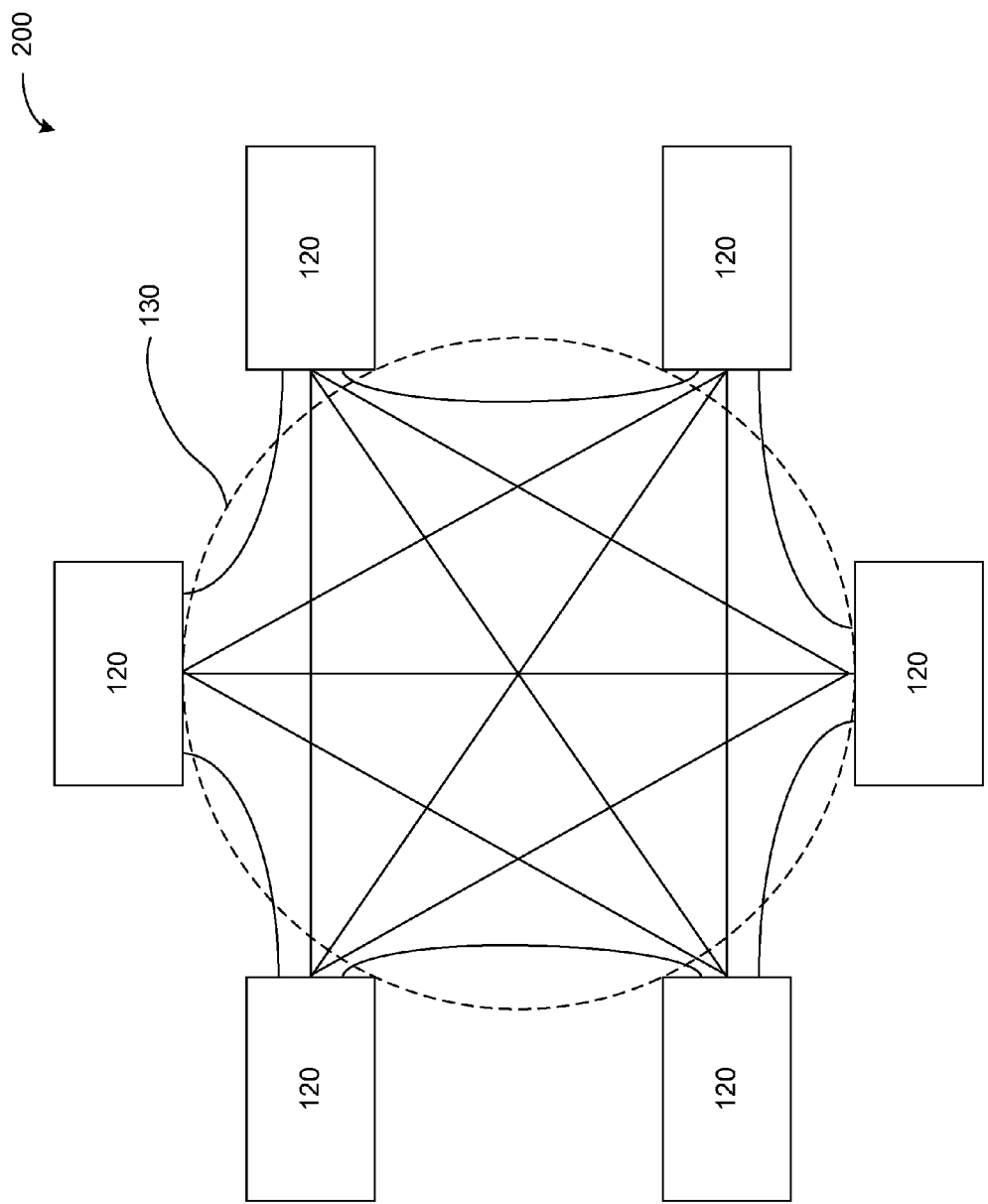
FIG. 2 illustrates components of a distributed network switch, according to one embodiment.

FIG. 2 illustrates a virtual switching layer, according to one embodiment. Each bridging element 120 in the system 100 is connected to each other using the switching layer 130 via a mesh connection schema. That is, no matter the bridging element 120 used, a cell (i.e., data packet) can be routed to another bridging element 120 located on any other switch module. This may be accomplished by directly connecting each bridging element 120—i.e., each bridging element 120 has a dedicated data path to every other bridging element 120.

In one embodiment, each switch module is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 3:
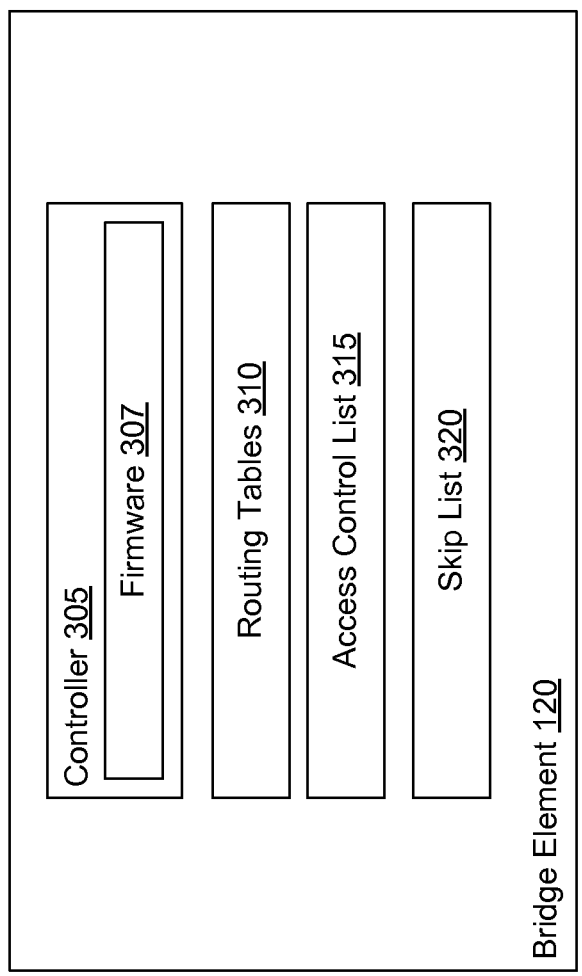
FIG. 3 illustrates a bridge element configured to skip and parse IPv6 extension headers of an Ethernet frame, according to one embodiment.

FIG. 3 illustrates a bridge element 120 configured to assign incoming frames to traffic classes based on priority bits and a type of each incoming frame, according to one embodiment. Each traffic class maintains a portion of a buffer pool that stores frames for further processing, such as for replicating multicast frames. As shown, the bridge element 120 includes a controller 305, routing tables 310, an access control list 315, and a skip list 320.

The controller 305 includes firmware 307. The firmware 307 provides various modules for managing components of the bridge element 120, such as the access control list 310. The controller 305 parses incoming Ethernet frames and performs actions on the frames based on the routing tables 310 and the access control list 315. The routing tables 310 indicate routes to particular network destinations and metrics associated with such routes. The access control list 315 provides a set of rules applied to port numbers of IP addresses to filter incoming network traffic and provide security. In one embodiment, the access control list may be implemented using a ternary content addressable memory.

The skip list 320 is a configurable list that specifies which IPv6 extension headers the controller 305 should skip over when parsing headers of an IPv6 frame. The controller 305 may identify entries in the skip list 320, e.g., by the decimal/hex value of a given extension header, a keyword of the extension header, etc. Skipping certain extension headers allows the controller 305 to more quickly obtain information pertinent to forwarding decisions for the frame, such as whether the frame is a TCP or UDP frame.

Figure 4:
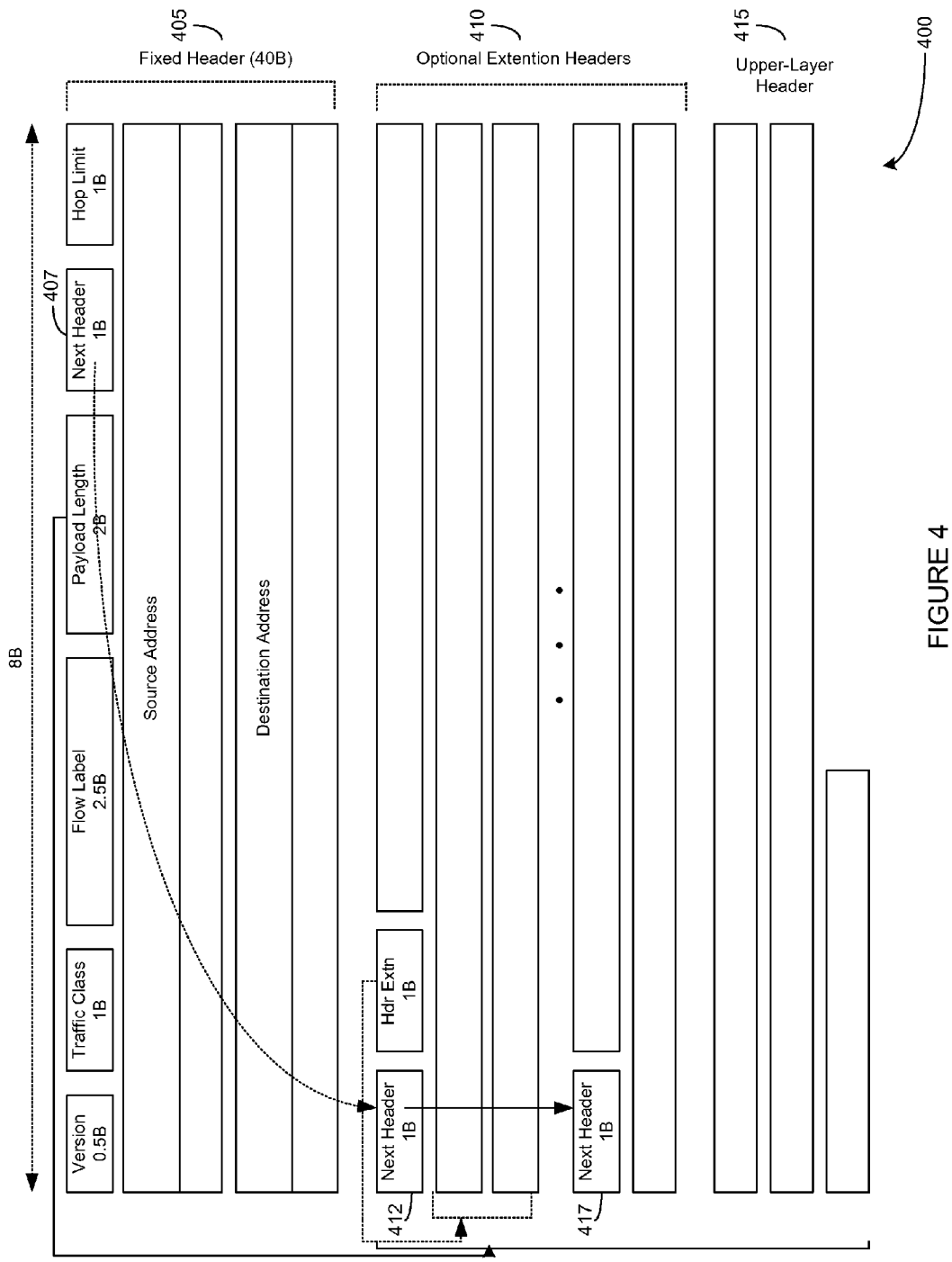
FIG. 4 illustrates an example IPv6 frame, according to one embodiment.

FIG. 4 illustrates an example IPv6 frame 400. For example, the frame 400 may be sent from a particular virtual machine 111 over a route optimized path. As shown, the frame 400 includes a fixed header 405, optional extension headers 410, and an upper layer header 415.

The fixed header 405 is a header of a 40-byte length that includes 16-byte fields for a source address and a destination address. In addition, the fixed header 405 includes several fields further describing the frame, such as a version field, a traffic class field, a flow label, a payload length field, and a hop limit field. The fixed header 405 also includes a next header 407 field describing a next header in the frame.

A next header field provides information about a header immediately following a current header. The information may include a header code, that is, a decimal value (or hex value) corresponding to an extension header 410. For example, a header code of 0 indicates that the following header is a hop-by-hop extension header. As another example, a header code of 43 indicates that the following header is a routing extension header. Such information allows the frame 400 to form a chain of extension headers 410 (as illustrated by the arrows connecting next headers 407, 412, and 417).

The upper-layer header 415 follows the extension headers 410. The upper-layer provides a payload provided in the frame. The next header field of the last extension header (or the fixed header, in the case that there are no extension headers) indicates a type of payload, such as whether the frame corresponds to a TCP segment or a UDP datagram.

Figure 5:
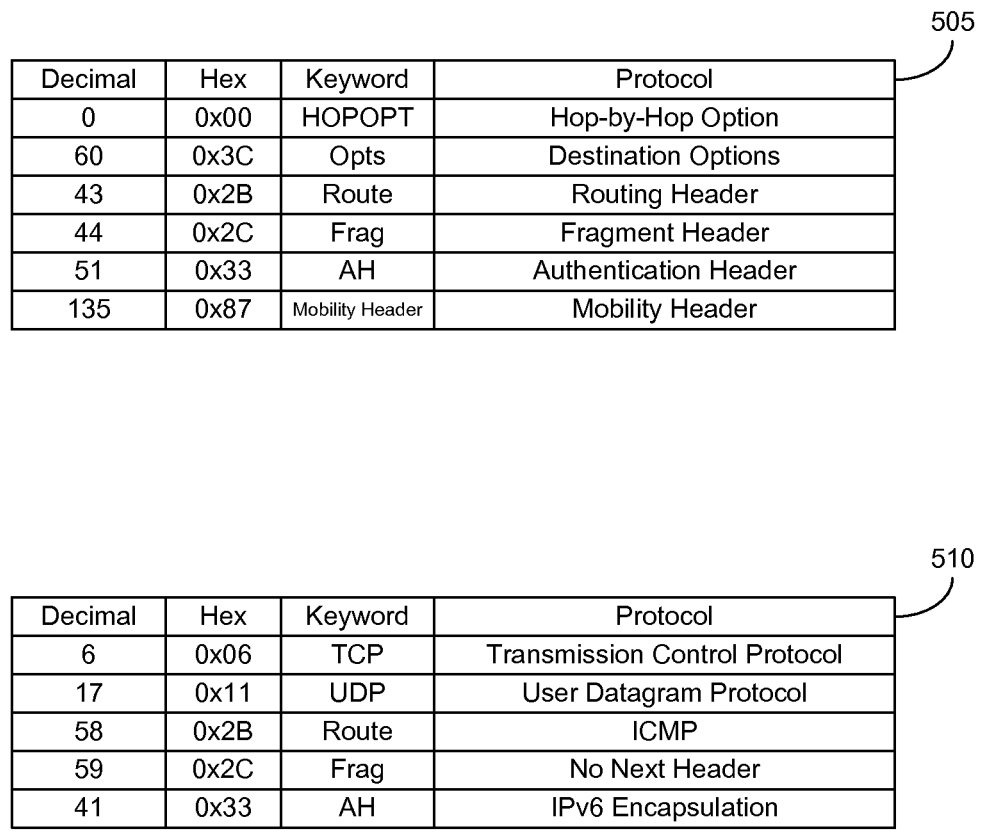
FIG. 5 illustrates an example extension header skip list, according to one embodiment.

FIG. 5 illustrates an example skip list 505, according to one embodiment. The controller 305 does not process extension headers specified in the skip list 505. Note, the skip list 505 merely provides an example of extension headers that the controller 305 may skip. Because the skip list 505 is a configurable list, extension headers may be added and removed from the list as desired. As an example, the skip list 505 specifies the hop-by-hop option header, destination options header, routing options header, fragment header, authentication header, and mobility header.

In one embodiment, the bridge element 120 may also include a list of extension headers not to skip when parsing an IPv6 frame. Such a list may be included to avoid skipping extension headers relevant in forwarding the frame, such as the TCP extension header and the UDP extension header.

FIG. 5 illustrates an example do-not-skip list 510. When the controller 305 reaches one of the extension headers specified in the list 510, the controller 305 analyzes the extension header normally and also proceeds to process each subsequent extension headers in the chain until reaching the upper-layer header.

Figure 6:
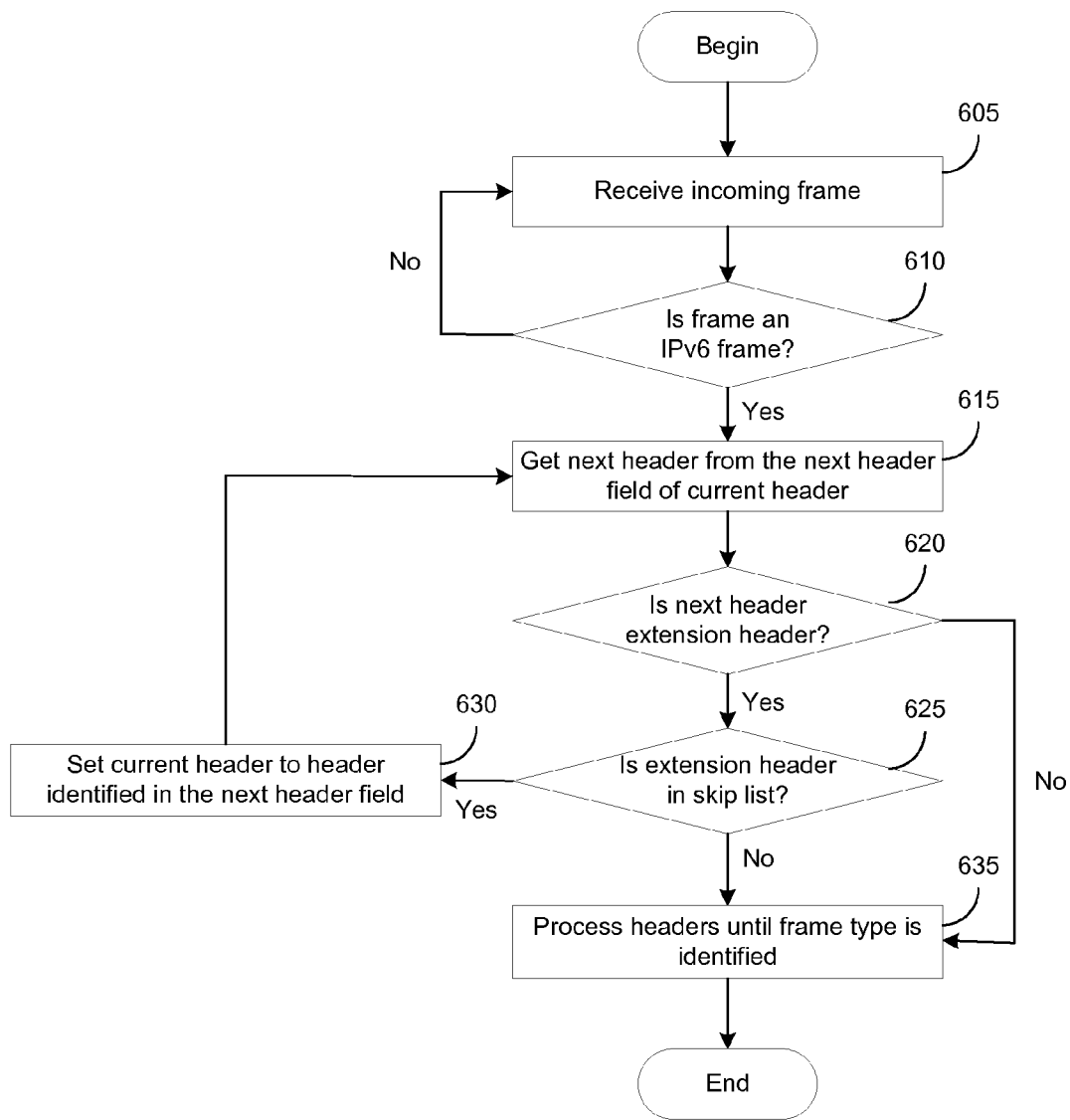
FIG. 6 illustrates a method for parsing an IPv6 frame and skipping extension headers of the frame, according to one embodiment.

FIG. 6 illustrates a method 600 for parsing an IPv6 frame and skipping extension headers specified in the skip list 320, according to one embodiment. Method 600 begins at step 605, where the bridge element 605 receives an incoming Ethernet frame. At step 610, the controller 305 evaluates the fixed header of the frame to determine whether the frame is an IPv6 frame. If so, then at step 615, the controller 305 parses the fixed header to obtain the next header from the next header field. At step 620, the controller 305 determines, based on the next header field of the fixed header, whether the next header in the frame is an extension header. For example, assume that the next header field of the fixed header indicates that the next header is of a "hop-by-hop" extension header.

At step 625, if the next header is an extension header, the controller 305 determines whether the extension header is in the skip list 320. If so, then the method returns to step 615, the controller 305 obtains the next header from the next header field of the extension header. The controller 305 also obtains the header length of the current extension header. Once obtained, the controller 305 iterates to the header identified in the next header field.

Continuing the example, assume that the "hop by hop" extension header is specified in the skip list 320. Because the "hop by hop" extension header is in the list, the controller 305 obtains the next header and length of the current header skips to the next header, thereafter repeating the previous steps. In doing so, the controller 305 effectively skips the "hop by hop" extension header to the next header in the header chain, without performing any analysis of the "hop by hop" extension header.

If the next header is not an extension header, or if the extension header is not on the skip list, then at step 635, the controller 305 processes each subsequent header in the frame until the frame type (e.g., whether the frame is TCP or UDP) is identified. Identifying the frame type allows the controller 305 to make forwarding decisions for the frame.

FIG. 7 illustrates sample code for carrying out steps 615-635 of the method 600, according to one embodiment. The correspondence between portions of the sample code to the method steps shown in FIG. 6 is shown in FIG. 7.

Note, the while loop provides several conditions once the bridge element 120 determines that the identified extension header is of type "Fragmentation Header" or "Routing Header."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a processor; and
a memory storing a program, which, when executed on the processor, performs an operation for parsing an Internet Protocol version 6 (IPv6) network frame received by a networking device, the operation comprising:
evaluating a current header of the IPv6 network frame to determine whether a header immediately following the current header is an IPv6 extension header of a chain of IPv6 extension headers or an upper-layer header of the IPv6 network frame, wherein each current header in the IPv6 network frame includes a respective next header field describing the header immediately following the current header and wherein the upper-layer header corresponds to a layer higher than the layer at which the method for parsing is performed, the current header being a fixed header or an IPv6 extension header of the chain of IPv6 extension header;
when determining, via the next header field of the current header, that the header immediately following the current header is an IPv6 extension header of the chain of IPv6 extension headers,
determine whether the IPv6 extension header matches a first corresponding IPv6 extension header specified in a skip list, the skip list specifying types of IPv6 extension headers to be skipped during parsing by the network device,
upon determining that the IPv6 extension header matches the first corresponding IPv6 extension header specified in the skip list, iterating through the chain of IPv6 extension headers via skipping parsing of a respective IPv6 extension header indicated by a respective next header field in each of the IPv6 extension headers in the chain of IPv6 extension headers until a second IPv6 extension header is reached, wherein the second IPv6 extension header does not match any IPv6 extension header in the skip list, and upon reaching the second IPv6 extension header, process each subsequent header in the IPv6 network frame until the upper-layer header is reached; and when determining, via the next header field of the current header, that the header immediately following the current header is the upper-layer header, make forwarding decision based on the upper-layer header.

2. The system of claim 1, wherein the operation further comprises, identifying a frame type from the upper-layer header.

3. The system of claim 2, wherein the type is one of a TCP frame or a UDP frame.

4. The system of claim 1, wherein iterating through the chain of IPv6 extension headers comprises, for each IPv6 extension header in the chain: evaluating a respective next header field of the IPv6 extension header to identify a respective next IPv6 extension header; and upon determining that the next IPv6 extension header matches a second corresponding IPv6 extension header in the skip list, jumping to an IPv6 extension header immediately following the next IPv6 extension header.

5. A computer program product, comprising:

a non-transitory computer-readable storage medium having computer-readable program code embodied therewith, the computer-readable program code configured to perform an operation for parsing an Internet Protocol version 6 (IPv6) network frame received by a networking device, the operation comprising:

evaluating a current header of the IPv6 network frame to determine whether a header immediately following the current header is an IPv6 extension header of a chain of IPv6 extension headers or an upper-layer header of the IPv6 network frame, wherein each current header in the IPv6 network frame includes a respective next header field describing the header immediately following the current header and wherein the upper-layer header corresponds to a layer higher than the layer at which the method for parsing is performed, the current header being a fixed header or an IPv6 extension header of the chain of IPv6 extension header;

when determining, via the next header field of the current header, that the header immediately following the current header is an IPv6 extension header of the chain of IPv6 extension headers, determine whether the IPv6 extension header matches a first corresponding IPv6 extension header specified in a skip list, the skip list specifying types of IPv6 extension headers to be skipped during parsing by the network device, upon determining that the IPv6 extension header matches the first corresponding IPv6 extension header specified in the skip list, iterating through the chain of IPv6 extension headers via skipping parsing of a respective IPv6 extension header indicated by a respective next header field in each of the IPv6 extension headers in the chain of IPv6 extension headers until a second IPv6 extension header is reached, wherein the second IPv6 extension header does not match any IPv6 extension header in the skip list, and upon reaching the second IPv6 extension header, process each subsequent header in the IPv6 network frame until the upper-layer header is reached; and when determining, via the next header field of the current header, that the header immediately following the current header is the upper-layer header, make forwarding decision based on the upper-layer header.

6. The computer program product of claim 5, wherein the operation further comprises, identifying a frame type from the upper-layer header.

7. The computer program product of claim 6, wherein the type is one of a TCP frame or a UDP frame.

8. The computer program product of claim 5, wherein iterating through the chain of extension headers comprises, for each extension header in the chain:

evaluating a respective next header field of the IPv6 extension header to identify a respective next IPv6 extension header; and upon determining that the respective next IPv6 extension header matches a corresponding IPv6 extension header in the skip list, jumping to an IPv6 extension header immediately following the next IPv6 extension header.

* * * * *